UNITED STATES PATENT OFFICE.

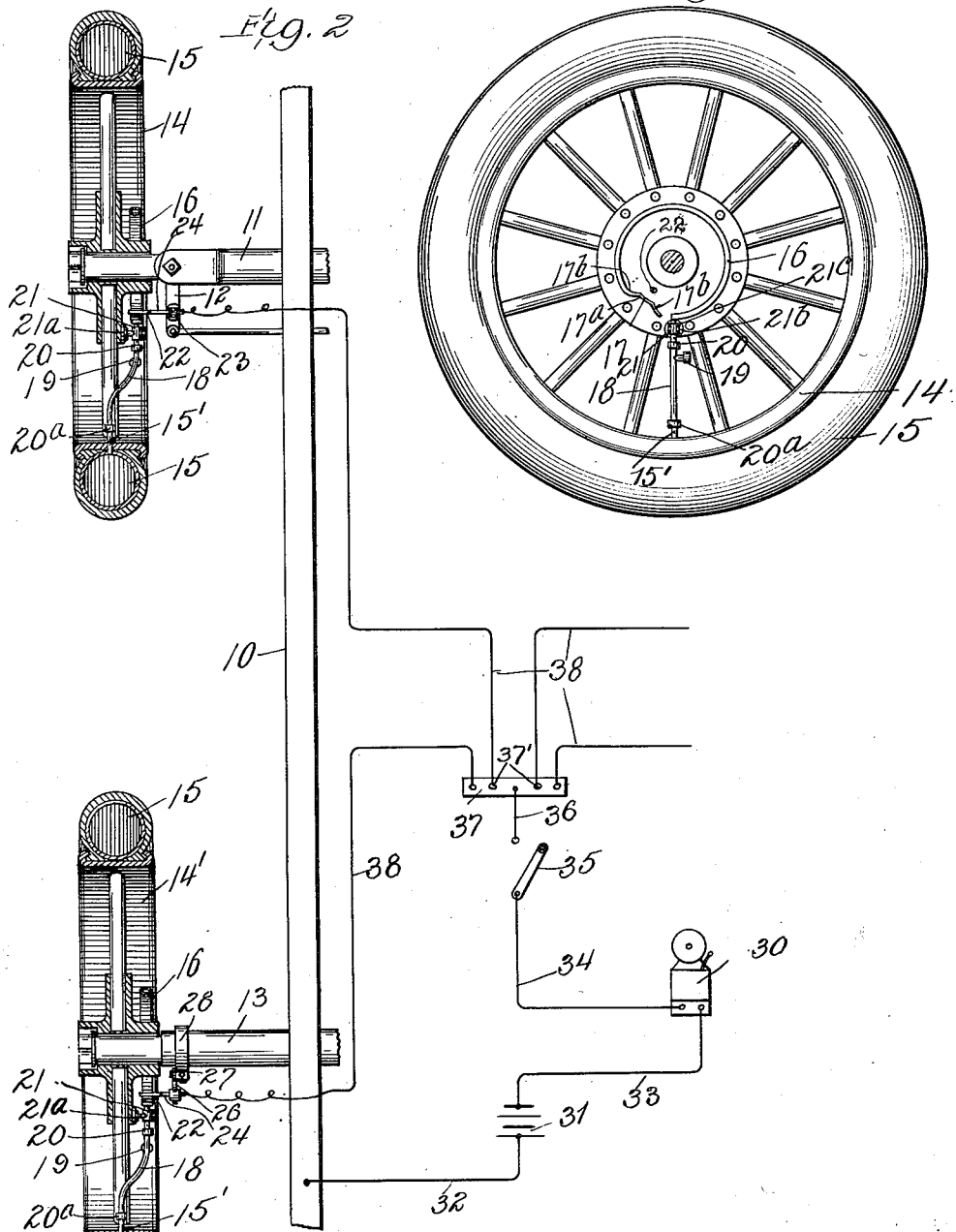

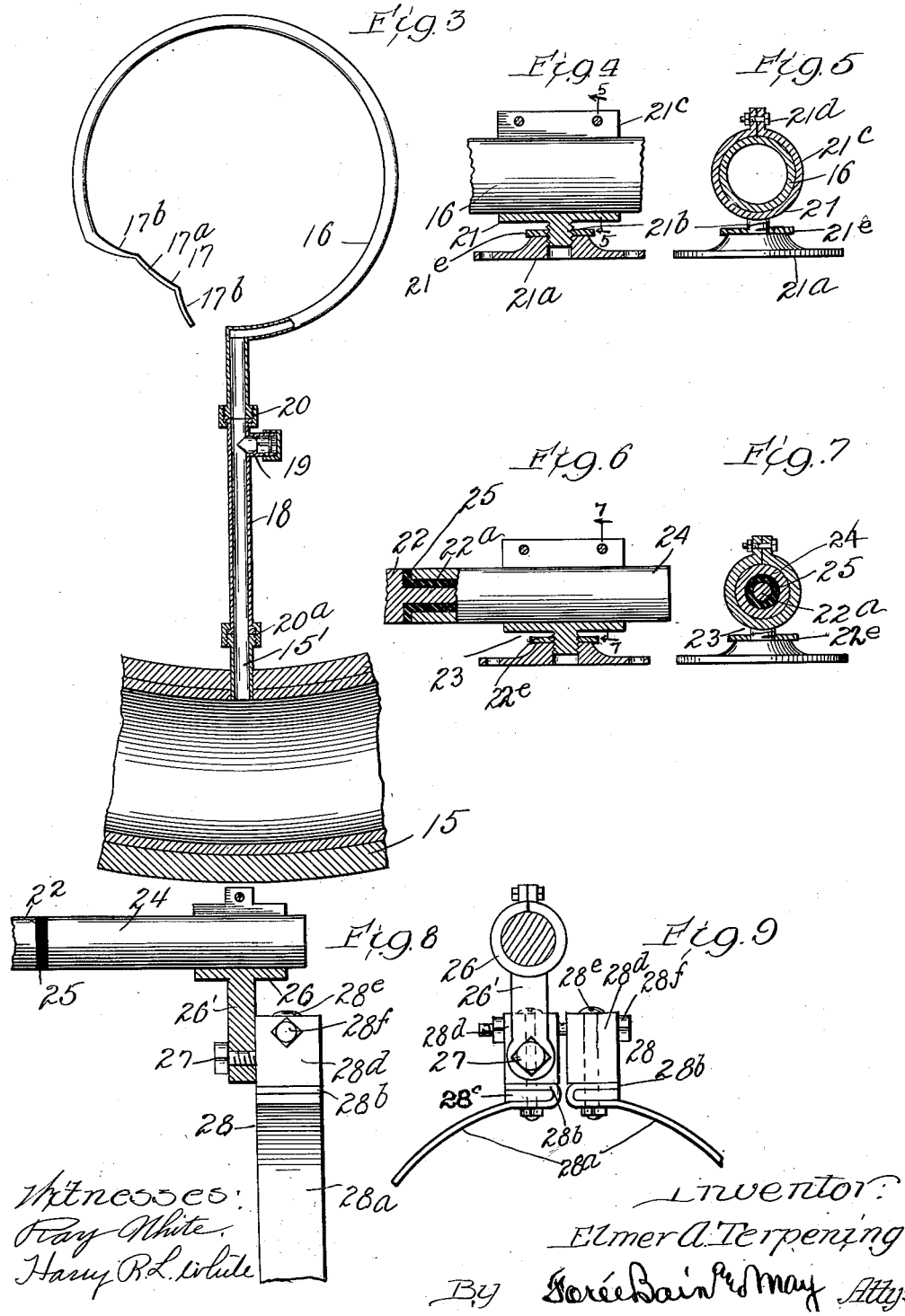

ELMER A. TERPENING, OF GENESEO, ILLINOIS.

TIRE-INFLATION-TESTING APPLIANCE.

984,453.  Specification of Letters Patent.  Patented Feb. 14, 1911.

Application filed April 28, 1906. Serial No. 314,234.

*To all whom it may concern:*

Be it known that I, ELMER A. TERPENING, a citizen of the United States, residing at Genesco, in the county of Henry and State of Illinois, have invented certain new and useful Improvements in Tire-Inflation-Testing Appliances, of which the following is a specification.

My invention relates to tire inflation testing appliances, and has for its primary object to provide a means whereby the degree of inflation of a pneumatic tire of an automobile, or the like, may be maintained under test, and an alarm given upon an abnormal reduction of the pressure in the tire.

A further object of my invention is to provide an appliance of the character described which will not be susceptible to ready derangement, which may readily be applied, easily kept in order, and which will sound an audible alarm indicative of abnormal reduction of pressure in the tire.

Other and further objects of my invention will best become apparent to those skilled in the art from the following description taken in conjunction with the accompanying drawings, wherein, Figure 1 is a side elevation of a wheel equipped with pressure testing instruments or appliances in accordance with my invention. Fig. 2 is a sectional fragment of an automobile frame and wheels, showing the application of an embodiment of my invention to the testing of the tires, and showing also wiring diagrams of circuit connections of the electrical parts. Fig. 3 is an enlarged detail of the pressure testing appliance. Figs. 4 and 5 are details of the gage attaching clamp. Figs. 6 and 7 are details of the contact holding clamps for the front or steering wheels of an automobile, and, Figs. 8 and 9 are details of a contact holding clamp for holding the contact for the rear wheels of an automobile.

Throughout the drawings like numerals of reference refer always to like parts.

In the drawings, 10 indicates in general the fragment of an automobile frame; and 11 is a fragment of the front axle; 12 the front steering knuckle, and 13 the rear axle. 14, 14' indicate the front and rear wheels, respectively, each provided with a pneumatic tire 15 provided with the usual valve stem 15' opening into and communicating with the interior of the tire. Upon each wheel is mounted a pressure testing appliance, preferably in the form of a Bourdon spring gage tube 16 arranged to partially encircle the hub of the wheel, and provided beyond its closed free end with a contact piece 17, preferably affording a central contact area 17ª and deflected areas 17ᵇ disposed at an angle thereto for a purpose which shall be hereafter made plain.

18 indicates a tubular connecting member, provided with a valve structure 19 of any usual or preferred construction which provides an outwardly seating spring-pressed valve member such as is commonly employed in tire inflation valves, and having at its opposite ends couplings 20, 20ª, adapted to be secured to the open end of the gage tube 16 and the valve stem 15' respectively, to effect communicating connection between said valve stem and the Bourdon tube.

It will be understood that the valve is removed from the stem 15' when the appliance is in place, or the said valve may be held open so that constant communication is effected between the interior of the tire and the Bourdon gage tube through the agency of the connection 18.

The gage structure is preferably secured in place upon the wheel by means of the clamp 21, applied at some suitable point upon or near the hub, such clamp being herein shown (Figs. 4 and 5) as comprising a base 21ª, wherein is screwed a stem 21ᵇ of a bifurcated clamp 21ᶜ, adapted to surround the rounded end of tube 16, and provided with screws 21ᵈ for drawing the portions of the clamp together to secure the same tightly upon the tube.

21ᵉ indicates a jam nut on the stem 21ᵇ. The base 21ª is secured to the hub, or spoke of the wheel, in any suitable manner and by turning the stem 21ᵇ relative to the base and turning the tube 16 in the clamp, the testing appliance may readily be brought to proper position upon the wheel. The connection 18, I have found, need not be secured other than by its couplings to the tire stem 15' and the rounded open end of the gage tube 16.

It will be understood that as long as the tire is maintained at proper pressure the tube 16 remains expanded, but as the pressure within the tire decreases the spring tube 16 contracts, drawing its contact part 17, connected with the free end thereof inward toward the axis of the wheel.

Associated with the gage structure 16 of each wheel is an electrical contact point 22 so disposed that while the gage is in condition to indicate proper inflation of the tire, it is inside the zone of travel of the contact part 17 carried by the gage but so that as the gage becomes contracted, owing to reduction of pressure in the tire, the path of movement of the member 17 is brought closer to the axis of rotation of the wheel, to include in said path the position occupied by the stationary contact member.

The stationary contact member for each wheel preferably comprises a metallic finger 22 suitably supported in fixed position relative to the wheel, and insulated from its supporting structure. In Figs. 6 and 7 is shown a suitable construction for attaching the stationary contact for the front wheel to the knuckle 12 of the steering gear, such structure comprising a clamp 23 preferably of construction similar to the clamp 21 above specifically described, said clamp supporting a tube 24 wherethrough passes the reduced stem 22ª of the finger 22, said stem being insulated from the tube 24, by an insulating bushing 25. The base of the clamp is attached to the steering knuckle at any suitable point, and it will be apparent that by rotatively adjusting the head of the clamp, the extremity of the contact may be moved closer to or further from the axis of rotation of the wheel, while by adjustment of the tube 24 in the clamp head, proper longitudinal projection of the contact 22 may be effected to bring the extremity thereof into vertical alinement with the movable contact 17 carried by the wheel.

The contact pin and holder 22 and 24 for the rear wheel, are in construction preferably like the parts above described, but the tube 24 is carried by a clamp 26 from which extends an arm 26′ connected for pivotal adjustment as by a screw 27 to the side of a block 28ᵈ, forming part of a clamp 28, which may be secured to the rear axle or some part associated therewith. The specific clamp construction 28 shown comprises a spring steel band, 28ª, having its ends 28ᵇ bent around blocks 28ᶜ and clamped against the blocks 28ᵈ by screws 28ᵉ taking through blocks 28ᵈ, spring-ends 28ᵇ and blocks 28ᶜ. 28ᶠ indicates the clamp adjusting screw connecting blocks 28ᵈ. The arm 26′ is of sufficient length to enable the contact pin, carried at the end thereof, to overlie the hub of the wheel, and it will be apparent that by rotative adjustment of said arm 26′ proper adjustment of the position of the contact radially relative to the wheel may be effected, while the contact 22 may be adjusted relative to clamp 26, as heretofore described.

The audible alarm preferably consists of a bell or buzzer, 30, located at some point adjacent the seat of the driver of the automobile, and included in electric circuit with the battery 31, said circuit being established from said battery 31 on the one hand by wire 32 to the frame of the machine, and on the other hand by wire 33 to the bell 30 and thence by wire 34 to a switch 35 from which connection is made by wire 36 to a bus-bar 37 whereto are connected, through normally-closed circuit-breaking push-buttons 37′, four wires 38, each extending to and connected with the stem 22′ of one of the contact members 22.

The operation of the apparatus will be as follows: Assuming the tires to be properly inflated and the switch 35 closed, none of the movable contacts 17 rotating with the wheels make contact with the relatively stationary contact pins 22 when the machine is in motion. If, however, any tire becomes deflated below a predetermined point, the gage tube 16 contracts so that the contact member 17, in its rotation with the wheel, strikes and makes electrical contact with the pin 22 associated therewith. Now an electrical circuit is closed, as long as the contact 17 remains in connection with the corresponding pin, the circuit being established from battery 31 by wire 33, bell 30, wire 34, switch 35, wire 36 and wire 38 to the corresponding pin, thence through the said pin to the connected contact 17, and through the metallic parts of the wheel, the axle 13 and the frame of the machine back to wire 32 and therethrough to the battery. Thus as long as the tire remains deflated an alarm is sounded during a portion of each revolution of the wheel to warn the driver of the automobile of the condition of his tire. By successively pressing push buttons 37′ the driver can ascertain which tire is deflated, as the intermittent alarm will obviously cease when the corresponding button is pressed.

While I have herein described in some detail a specific embodiment of my invention, it will be apparent to those skilled in the art that numerous changes in the construction might be made without departure from the spirit and scope thereof, and I do not desire to be understood as limiting myself to the specific features shown further than as specified in the claims.

Having thus described my invention, what I claim and desire to secure by Letters Patent of the United States is:

1. In combination with a vehicle wheel and a pneumatic tire, of a Bourdon spring tube, fixed to the wheel for rotation therewith, and connected with the interior of the tire to respond to pressure variations therein, said tube being arranged for movements in response to such variations of pressure, to vary the radial distance of its end from the axis of rotation of the wheel, and a signaling device associated with the tube for actuation thereby, when its end travels at a radial distance from the center indicative of an abnormally low pressure.

2. In combination with a wheel having a pneumatic tire provided with a stem, a connection detachably connected to said stem and in constantly open communication therewith, said connection having an inlet opening thereto, and an outwardly seating automatic valve closing said inlet opening; a pressure gage comprising a Bourdon tube into which the connection constantly opens, mounted upon and rotatable with the wheel; a low pressure contact toward which said Bourdon tube moves upon reduction of pressure, and an electrical alarm arranged in a circuit controlled by said Bourdon tube and low pressure contact.

3. In combination with a wheel having a pneumatic tire provided with an open stem, a Bourdon spring tube coiled around the wheel-hub for rotation therewith, a detachable open connection between the tube and the tire stem, said connection having therein an inlet, an outwardly seating automatic valve for normally closing said inlet, and a signal device operatively associated with the tube for control thereby.

In testimony whereof I hereunto set my hand in the presence of two witnesses.

ELMER A. TERPENING.

In the presence of—
F. H. McARTHUR,
JOHN M. CASTELLO.